(12) United States Patent
Suzuki et al.

(10) Patent No.: US 8,384,349 B2
(45) Date of Patent: Feb. 26, 2013

(54) MONITORING SYSTEM FOR ELECTRIC POWER TOOL, BATTERY PACK FOR ELECTRIC POWER TOOL, AND BATTERY CHARGER FOR ELECTRIC POWER TOOL

(75) Inventors: Hitoshi Suzuki, Anjo (JP); Tadahiko Kobayakawa, Anjo (JP); Tomoo Muramatsu, Anjo (JP)

(73) Assignee: Makita Corporation, Anjo (JP)

( * ) Notice: Subject to any disclaimer, the term of this patent is extended or adjusted under 35 U.S.C. 154(b) by 356 days.

(21) Appl. No.: 12/588,042

(22) Filed: Oct. 1, 2009

(65) Prior Publication Data

US 2010/0085008 A1 Apr. 8, 2010

(30) Foreign Application Priority Data

Oct. 8, 2008 (JP) .................. 2008-261825
Nov. 10, 2008 (JP) .................. 2008-287765
Jan. 8, 2009 (JP) .................. 2009-002596
Jan. 16, 2009 (JP) .................. 2009-007664

(51) Int. Cl.
*H02J 7/00* (2006.01)
*H02K 7/14* (2006.01)
*B25D 16/00* (2006.01)

(52) U.S. Cl. ........ 320/112; 320/114; 320/116; 320/107; 310/50; 173/214

(58) Field of Classification Search .................. 320/112
See application file for complete search history.

(56) References Cited

U.S. PATENT DOCUMENTS

| | | | |
|---|---|---|---|
| 5,872,444 A | 2/1999 | Nagano et al. | |
| 5,905,362 A | 5/1999 | Nagano et al. | |
| 6,008,620 A | 12/1999 | Nagano et al. | |
| 6,191,554 B1 * | 2/2001 | Nakane et al. | 320/114 |
| 6,225,783 B1 | 5/2001 | Nagano et al. | |
| 6,229,280 B1 * | 5/2001 | Sakoh et al. | 320/106 |
| 6,268,710 B1 * | 7/2001 | Koga | 320/116 |
| 6,296,065 B1 * | 10/2001 | Carrier | 173/217 |
| 6,924,624 B2 | 8/2005 | Baur et al. | |
| 7,492,124 B2 | 2/2009 | Johnson et al. | |
| 7,714,538 B2 * | 5/2010 | Johnson et al. | 320/114 |

(Continued)

FOREIGN PATENT DOCUMENTS

| | | |
|---|---|---|
| CN | 1677788 A | 10/2005 |
| EP | 1 533 882 A2 | 5/2005 |

(Continued)

OTHER PUBLICATIONS

European Search Report in European Patent Application No. 09012647.5; dated Sep. 1, 2010.

(Continued)

*Primary Examiner* — Yalkew Fantu
(74) *Attorney, Agent, or Firm* — Oliff & Berridge, PLC

(57) ABSTRACT

A battery monitoring system for electric power tool includes a battery pack for electric power tool and an auxiliary power source. The battery pack has a battery and a monitoring circuit. The battery is provided with at least one battery cell. The monitoring circuit is operated by electric power supplied from the battery, and monitors a status of the battery. The auxiliary power source outputs electric power allowing the monitoring circuit to operate. The monitoring circuit is configured such that, when the monitoring circuit is unoperational with the electric power of the battery due to a decrease in a voltage of the battery, the monitoring circuit becomes operational by the electric power supplied from the auxiliary power source.

14 Claims, 6 Drawing Sheets

U.S. PATENT DOCUMENTS

| | | | |
|---|---|---|---|
| 2002/0190693 A1 | 12/2002 | Kitagawa et al. | |
| 2005/0280393 A1* | 12/2005 | Feldmann | 320/114 |
| 2006/0118315 A1* | 6/2006 | Suzuki et al. | 173/2 |
| 2006/0180327 A1 | 8/2006 | Nagasaka et al. | |
| 2006/0214627 A1 | 9/2006 | Ito et al. | |

FOREIGN PATENT DOCUMENTS

| | | |
|---|---|---|
| EP | 1 883 143 A1 | 1/2008 |
| JP | A-9-285026 | 10/1997 |
| JP | A-2000-260483 | 9/2000 |
| JP | A-2003-264008 | 9/2003 |
| JP | A-2006-218605 | 8/2006 |
| JP | A-2006-280043 | 10/2006 |
| JP | A-2007-82379 | 3/2007 |
| WO | WO 2007/050439 A2 | 5/2007 |

OTHER PUBLICATIONS

Office Action issued in Chinese Patent Application No. 2009101794356 dated May 17, 2011 (with translation).

Office Action issued in European Patent Application No. 09012647.5 dated Aug. 9, 2011.

* cited by examiner

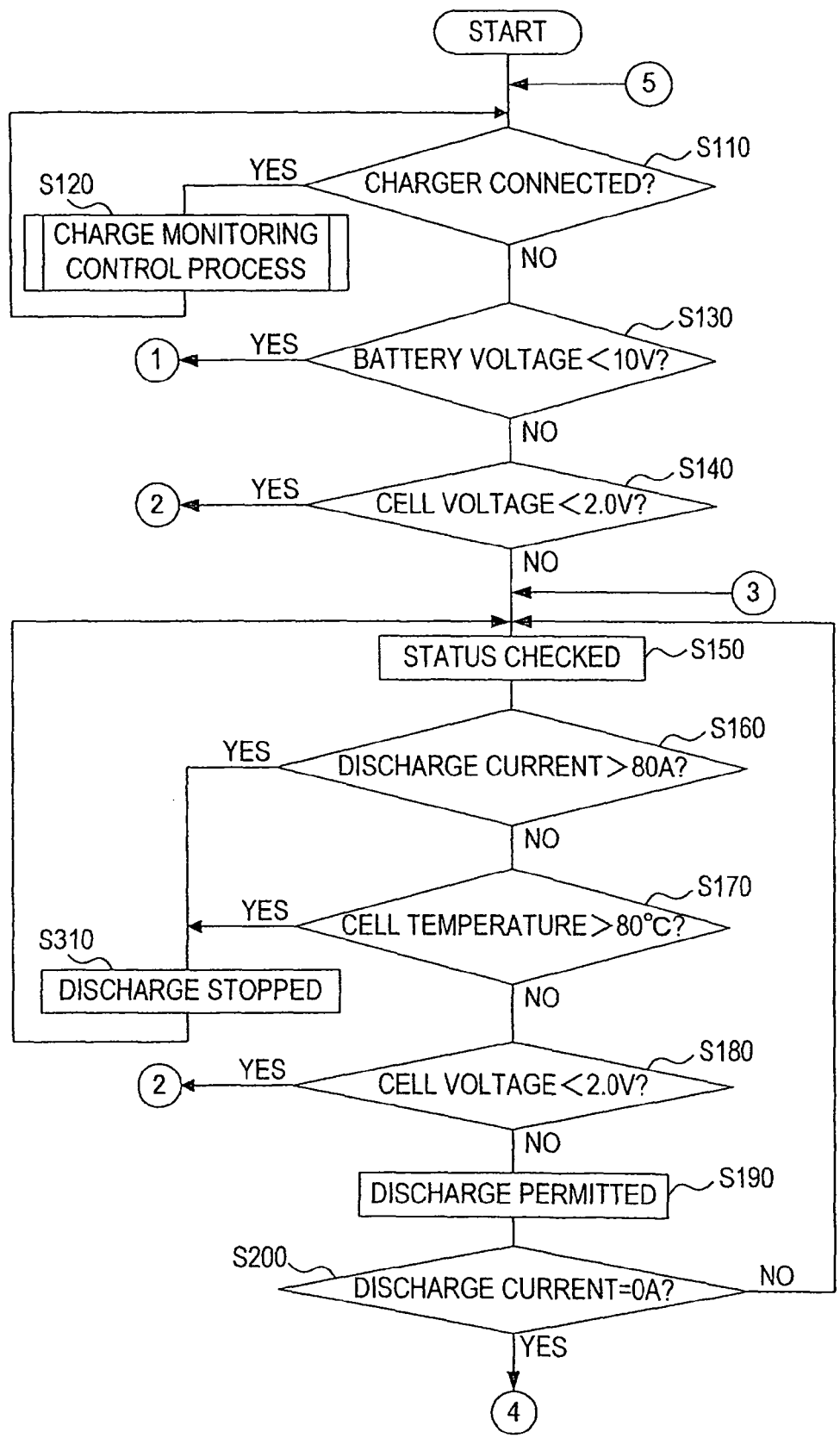

US 8,384,349 B2

MONITORING SYSTEM FOR ELECTRIC POWER TOOL, BATTERY PACK FOR ELECTRIC POWER TOOL, AND BATTERY CHARGER FOR ELECTRIC POWER TOOL

CROSS-REFERENCE TO RELATED APPLICATIONS

This application claims the benefit of Japanese Patent Applications No. 2008-261825 filed Oct. 8, 2008, No. 2008-287765 filed Nov. 10, 2008, No. 2009-002596 filed Jan. 8, 2009, and No. 2009-007664 filed Jan. 16, 2009 in the Japan Patent Office, the disclosures of which are incorporated herein by reference.

BACKGROUND

The present invention relates to a battery monitoring system for electric power tool that monitors a status of a battery inside a battery pack. The battery is used as a driving power source for the electric power tool. This invention also relates to a battery pack for electric power tool and a battery charger for electric power tool, both of which constitute the above system.

In a battery pack for electric power tool using a battery which includes a lithium-ion rechargeable battery (hereinafter also referred to as "a battery pack"), a monitoring circuit is generally included. The monitoring circuit is to always monitor a status of the battery. Items to be monitored by the monitoring circuit includes, for example, a voltage of each battery cell composing the battery, a decreasing degree of a voltage of the battery, a temperature of each battery cell for a temperature of the entire battery), a charge/discharge current to/from the battery, and the like.

It is generally configured that the monitoring circuit monitors the battery while the battery is charged and while the battery is discharged to the electric power tool which is an object to be supplied with electric power from the battery. In view of the above, the battery is used as a power source of the monitoring circuit.

In the battery pack including the monitoring circuit that is operated by using the battery as the power source as described above, it is inevitable that electric power of the battery is always consumed by the monitoring circuit although in a small amount. Consequently, even if the battery is not supplying electric power to the power tool and is simply left unused, discharging of the battery continues. As a result, a remaining battery capacity gradually decreases and eventually becomes empty. When the battery capacity decreases, the voltage of the battery also decreases. Furthermore, the monitoring circuit may become unoperational.

A method of inhibiting a decrease in the battery capacity is, for example, as follows. One method is, when the battery pack is not in use, e.g., when the battery pack is simply left unused, the monitoring circuit is switched to a sleep mode so as to stop part or all of operations of the monitoring circuit. Another method is, when the voltage of the battery falls below a certain level, supply of the electric power to each circuit inside the battery pack from the battery is completely stopped. No matter what method as such is used, however, due to natural discharge (self discharge) of a battery, even in a case that the battery is simply left unused, the voltage of the battery will be gradually decreased in the long term. Because of this, the battery is brought into an overdischarge state. As a result, the monitoring circuit becomes unoperational due to an insufficient voltage of the power source.

A battery charger that charges the battery pack including the monitoring circuit is generally configured to control charging based on a monitoring result (i.e., a status of the battery) of the monitoring circuit. However, in the battery charger configured as above, if charging is performed to the battery pack whose monitoring circuit is unoperational due to a decrease in the voltage of the battery, the following problem may occur. That is, since it is impossible to obtain the monitoring result from the battery pack, charging may not be performed normally or not be performed at all.

In this regard, as a method for charging a battery pack in which a voltage of a battery is decreased such that a monitoring circuit becomes unoperational, Unexamined Japanese Patent Publication No. 2007-82379 discloses the following method: if the voltage of the battery is equal to or less than a predetermined value, charging is started regardless of a monitoring result by the monitoring circuit, an attainment condition of the monitoring result, etc. In this method, after the voltage of the battery is recovered, a monitoring operation is started.

However, when charging is performed to a battery pack which is discharged such that the monitoring circuit becomes unoperational, for example, due to the battery pack being left unused for a long period of time, if charging is performed regardless of operations of the monitoring circuit in the same manner as the method described in Patent Publication, the following problem may arise. That is, when some abnormality of the battery occurs, or even when some abnormality of the battery had already occurred before starting the charging, the charging may be continued without the abnormality being detected.

There are various abnormalities which may occur in a battery in an overdischarge state. One example of the abnormalities is an internal short-circuit developed in a battery cell which constitutes a battery. When charging is performed to the battery having the battery cell which has developed the internal short-circuit as above, a voltage of the battery as a whole may not be recovered to a normal value. Moreover, since charging is continued, some normal battery cells may be further continued to be charged and be brought into an overcharge state.

Thus, it is not desirable to continue charging regardless of an operation of a monitoring circuit. In other words, it is not desirable to continue charging, despite the possibility that abnormality may have occurred in a battery cell constituting a battery.

The above problem may occur in not only a battery pack having a battery cell which is composed of a lithium ion rechargeable battery, but also various battery packs having a monitoring circuit which monitors a status of a battery.

In one aspect of the present invention, it is preferable that, in a battery pack including a monitoring circuit operated by a battery as a power source, if a voltage of the battery is decreased such that the monitoring circuit becomes unoperational, the monitoring circuit is operational at least when the battery is charged.

SUMMARY

A battery monitoring system for electric power tool in a first aspect of the present invention includes a battery pack for electric power tool and an auxiliary power source.

The battery pack has a battery and a monitoring circuit. The battery is used as a driving power source for the electric power tool and has at least one battery cell. The monitoring circuit is operated by electric power supplied from the battery and monitors a status of the battery.

The auxiliary power source is provided inside or separately from the battery pack and outputs electric power allowing the monitoring circuit to operate. The monitoring circuit is configured such that the monitoring circuit is operational by the electric power supplied from the auxiliary power source, when the monitoring circuit becomes unoperational with the electric power of the battery due to a decrease in a voltage of the battery.

According to the battery monitoring system of the present invention constituted as above, even if the voltage of the battery is decreased such that the monitoring circuit becomes unoperational due to, for example, the battery pack being left unused for a long period of time, the monitoring circuit is operational by the auxiliary power source, instead of by the above battery. Therefore, when charging is performed to a battery in which a voltage of the battery is decreased as described above, it is possible to operate the monitoring circuit by the auxiliary power source while charging the battery.

In the battery monitoring system of the present invention, the auxiliary power source may be provided in various manners. For example, in a case that the at least one battery cell included in the battery is a rechargeable battery cell, the auxiliary power source may be provided inside a battery charger for charging the battery.

That is to say, the battery monitoring system preferably includes a battery charger for electric power tool which is configured such that the battery pack is detachably attached to the battery charger. The battery charger generates and outputs charging power for charging the battery. The auxiliary power source may be provided inside the battery charger. Also, it may be configured that the electric power of the auxiliary power source can be supplied to the battery pack when the battery pack is attached to the battery charger.

According to the battery monitoring system as constituted above, even if the voltage of the battery is decreased such that the monitoring circuit becomes unoperational, when the battery charger is connected to charge the above battery, not only the electric power for charging the battery, but also the electric power of the auxiliary power source is supplied from the battery charger. Therefore, even if the voltage of the battery is decreased, it is possible to operate the monitoring circuit at least when the battery is charged.

In the battery monitoring system in which the auxiliary power source is provided inside the battery charger, the following configuration may be possible. That is, the battery charger may include a charger-side terminal that outputs the electric power of the auxiliary power source to the battery pack. Also, the battery pack may include a battery pack-side terminal. When the battery pack is attached to the battery charger, the battery pack-side terminal is connected to the charger-side terminal. Then, the electric power of the auxiliary power source outputted from the charger-side terminal is inputted to the battery pack through the battery pack-side terminal.

In the battery monitoring system constituted as above, when the battery pack is attached to the battery charger, the battery pack-side terminal and the charger-side terminal are connected to each other. Thus, the electric power of the auxiliary power source can be reliably supplied to the battery pack via the terminals. Accordingly, the monitoring circuit can be reliably operated when charging is performed.

In the battery monitoring system in which the auxiliary power source is provided inside the battery charger, it may be configured that monitored items (i.e., a status of the battery) by the monitoring circuit can be transferred to the battery charger. In other words, the battery pack may include an output terminal that outputs the monitored items by the monitoring circuit to the battery charger. Also, the battery charger may include an input terminal. When the battery pack is attached to the battery charger, the input terminal is connected to the output terminal. Then, the monitored items outputted from the output terminal are inputted to the battery charger through the input terminal.

In the battery monitoring system constituted as above, the monitored items by the monitoring circuit are inputted (transferred) from the battery pack to the battery charger via the output terminal and the input terminal. Therefore, the battery charger makes it possible to control a charging operation based on the inputted monitored items when the battery is charged.

In the battery monitoring system in which the monitored items by the monitoring circuit can be outputted to the battery charger as described above, it may also be configured as follows: when the monitoring circuit determines that the battery is in a chargeable state, the battery charger may perform charging of the battery.

The monitoring circuit may include a chargeability determination unit and a signal output unit. The chargeability determination unit determines whether or not the battery is in a chargeable state by monitoring the battery. When the chargeability determination unit determines that the battery is in a chargeable state, the signal output unit outputs, as one of the monitored items, a charge permission signal to the output terminal. The charge permission signal indicates that the battery is in a chargeable state.

Then, when the charge permission signal is inputted to the battery charger from the battery pack via the input terminal, the battery charger outputs the charging power to the battery pack.

According to the battery monitoring system constituted as above, when the monitoring circuit determines that the battery is in a chargeable state, charging to the battery is performed. Therefore, it can be inhibited that even though abnormality has occurred in the battery, charging is performed to such battery.

In the battery monitoring system in which the auxiliary power source is provided inside the battery charger, the following configuration may be possible. That is, the battery pack determines whether or not the battery charger is attached based on whether or not the electric power of the auxiliary power source is applied. Specifically, the battery pack may include a connection detecting unit. When the electric power of the auxiliary power source is inputted to the battery pack as a result of the battery pack being attached to the battery charger, the connection detecting unit detects that the battery pack is attached to the battery charger based on an input of the electric power of the auxiliary power source.

In the battery monitoring system constituted as above, the electric power of the auxiliary power source is used not only for operating the monitoring circuit when the voltage of the battery is decreased, but also for detecting that the battery pack is attached to the battery charger. Accordingly, it becomes possible to provide a monitoring system which allows a simple and effective detection of whether or not the battery pack is attached to the battery charger.

In the battery monitoring system of the present invention, the monitoring circuit may be configured such that the voltage of the battery or the voltage of the auxiliary power source is directly inputted to the monitoring circuit, thereby allowing the monitoring circuit to operate. For example, a power supply circuit may be provided in the battery pack. The voltage of the battery and the voltage of the auxiliary power source may be inputted to the power supply circuit. The power supply circuit may generate an operating power source for operating the monitoring circuit based on one of the voltages inputted as above. The monitoring circuit may be operational with the operating power source generated by the power supply circuit.

In the battery monitoring system constituted as above, even if the voltage of the battery and the voltage of the auxiliary power source cannot be directly inputted to the monitoring circuit, the power source circuit makes it possible to generate a desired power source for operating the monitoring circuit. This offers greater flexibility (especially, in values of the above voltages) in the configuration of the battery monitoring system.

In the battery monitoring system in which the battery pack is provided with the power supply circuit, the power supply circuit may be configured to generate the operating power source based on a greater one of the voltage of the battery and the voltage of the auxiliary power source. This configuration makes it possible to generate the operating power in a more stable manner.

In this case, the power supply circuit may include, more specifically, a generating circuit, a first diode, and a second diode. The generating circuit may be configured such that one of the voltage of the battery and the voltage of the auxiliary power source is inputted to the generating circuit. The generating circuit generates an operating power source based on the voltage inputted. The first diode has a cathode connected to an input side of the generating circuit. The first diode also has an anode to which the voltage of the battery is inputted. The second diode has a cathode connected to the input side of the generating circuit. The second diode also has an anode to which the voltage of the auxiliary power source is inputted.

The power supply circuit is configured such that each of the voltage of the battery and the voltage of the auxiliary power source is inputted to the generating circuit via the respective diodes. Thereby, without providing a specific switching circuit and the like, the generating circuit can generate the operating power source based on a greater one of the voltage of the battery and the voltage of the auxiliary power source.

The battery pack including the power supply circuit as above may be further provided with an output stopping unit. The output stopping unit may be provided on a current-carrying path extending from where the voltage of the auxiliary power source is inputted to the battery pack, to where the voltage of the auxiliary power source reaches the power supply circuit. The output stopping unit inhibits the voltage of the battery, which is to be inputted to the power supply circuit, from being outputted to an auxiliary power source side via the current-carrying path.

That is, the voltage of the battery and the voltage of the auxiliary power source are both inputted to the power supply circuit. If there is a failure in the power supply circuit, the voltage of the battery may be applied to the auxiliary power source side, depending on a degree of the failure. Thus, by providing the output stopping unit on the current-carrying path extending from the auxiliary power source to the power supply circuit, it becomes possible to inhibit the voltage of the battery from being inadvertently outputted to the auxiliary power source side from the power supply circuit side.

It should be understood that details of the configuration of the output stopping unit can be made in various ways. For example, the output stopping unit may be configured by using a third diode. The third diode may have a cathode connected to the power supply circuit side. The third diode may also have an anode to which the voltage of the auxiliary power source is inputted. Moreover, the output stopping unit may be configured by using a fuse, for example.

As above, if the output stopping unit is configured by the third diode or the fuse, it may be possible to provide the output stopping unit in a simpler manner.

A battery pack for electric power tool in a second aspect of the present invention constitutes the above-described battery monitoring system of the present invention. According to the battery pack, even if a voltage of a battery is decreased such that a monitoring circuit becomes unoperational, the monitoring circuit is operational by the auxiliary power source, instead of by the battery. Therefore, it is possible to charge the battery while operating the monitoring circuit.

A battery charger for electric power tool in a third aspect of the present invention constitutes the above-described battery monitoring system (here, referred to the system provided with a battery charger for electric power tool) of the present invention. According to this battery charger, when the battery pack is attached to the battery charger, it is possible to supply electric power to the battery pack from an internally provided auxiliary power source. Therefore, even if a voltage of a battery inside the battery pack is decreased, the monitoring circuit inside the battery pack is operational by the electric power from the auxiliary power source.

BRIEF DESCRIPTION OF THE DRAWINGS

An embodiment of the present invention will now be described by way of example with reference to the accompanying drawings, in which:

FIGS. 3A and 3B are flowcharts showing a flow of control processes for battery monitoring executed by a microcomputer of the battery pack;

Figure 1:
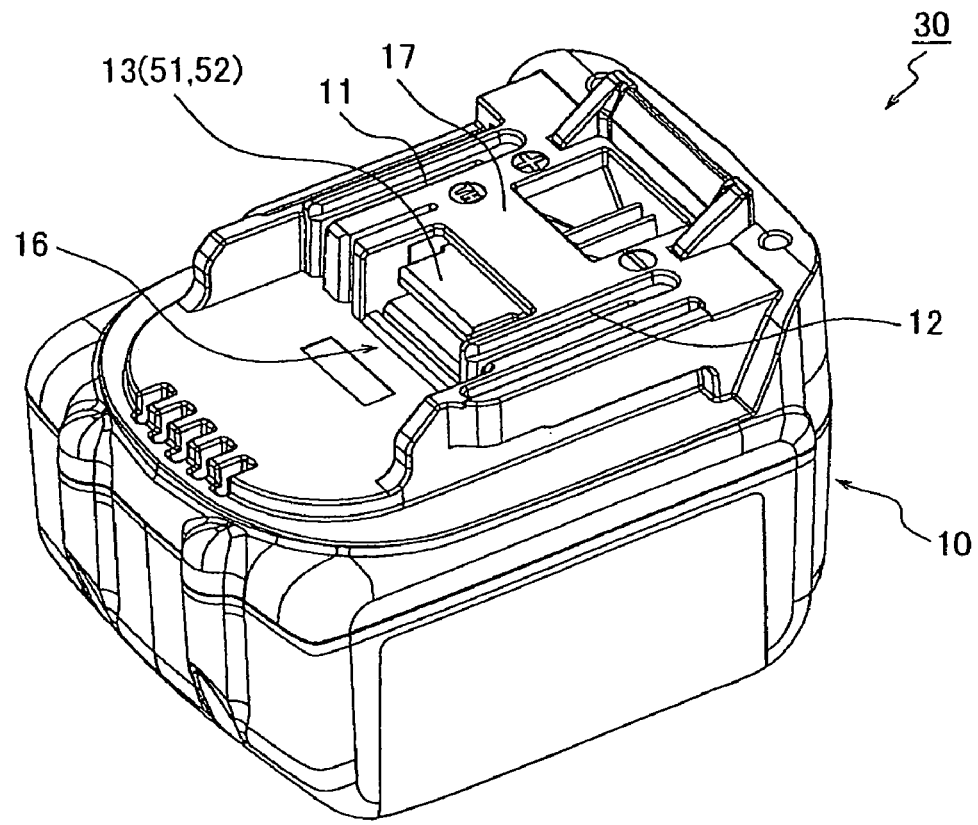
FIG. 1 is a perspective view showing an appearance of a battery pack and a battery charger for electric power tool, both of which constituting a charging system for electric power tool.
Figure 1:
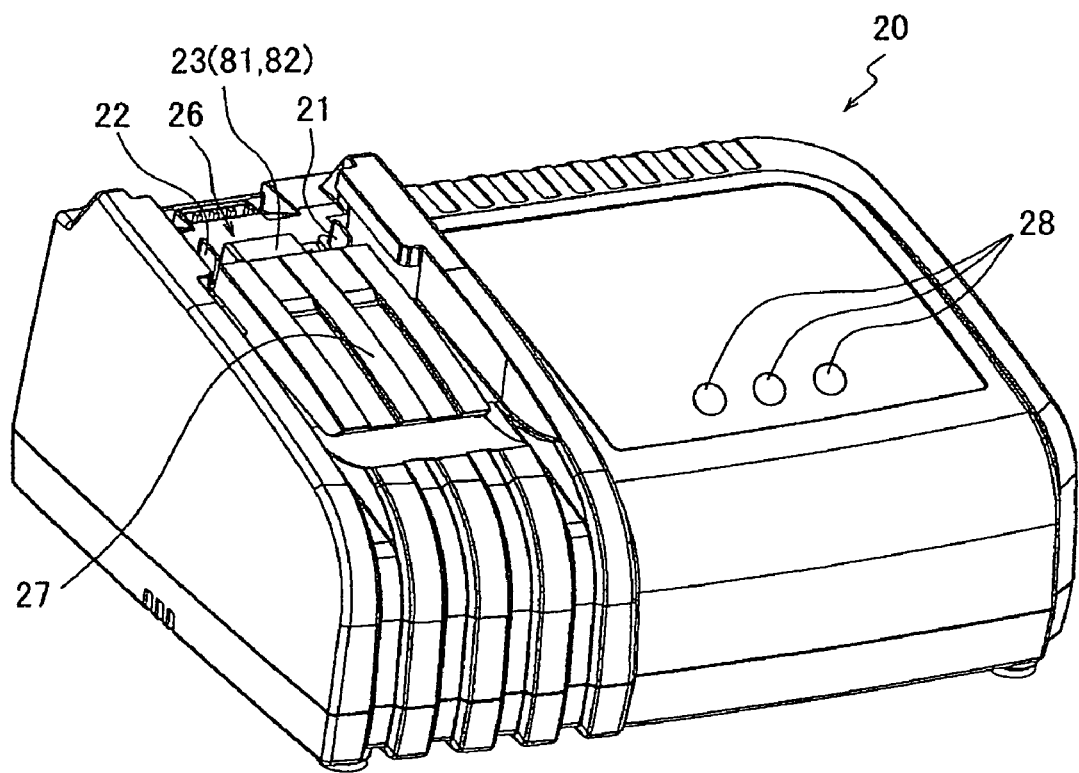

DETAILED DESCRIPTION OF THE PREFERRED EMBODIMENTS (1) General Structure of Charging System for Electric Power Tool A charging system 30 for electric power tool shown in FIG. 1 is an embodiment of a battery monitoring system for electric power tool according to the present invention.

A battery pack 10 is detachably attached to various types of electric power tools, for example, a rechargeable impact driver, a rechargeable driver drill, a rechargeable impact wrench, and the like (these are examples only). The battery pack 10 supplies, to the electric power tools, a power source for operating the electric power tools. The battery pack 10 includes therein a battery 31 (see FIG. 2) as a power source.

The battery pack 10 includes a battery-side attachment portion 17 formed on one side thereof. The battery-side attachment portion 17 is attached to a charger-side attachment portion 27 of a battery charger 20 or to a tool body of the electric power tool. At a predetermined position in the battery-side attachment portion 17, a battery-side terminal 16 is further provided. The terminal 16 is electrically connected to a charger-side terminal 26 of the battery charger 20 or a tool-side terminal (not shown) of the tool body.

The terminal 16 is configured to include a battery-side positive terminal 11, a battery-side negative terminal 12, and battery-side signal terminal groups 13. The terminals 11 and 12 are energized by charge/discharge current. The signal terminal groups 13 are composed of a plurality of terminals including at least a charger-side control voltage input terminal 51 and a charge permission/stop signal output terminal 52 (see FIG. 2).

The battery charger 20 generates a direct-current charging power source (charging power) of a predetermined voltage for charging the battery 31 inside the battery pack 10 from a not-shown external input power source (in the present embodiment, an AC 100 V power source). The battery charger 20 includes the charger-side attachment portion 27 formed on one end side of an upper surface of the battery charger 20. The battery pack 10 is attached to the charger-side attachment portion 27. At a predetermined position in the charger-side attachment portion 27 (inside the charger-side attachment portion 27), the charger-side terminal 26 is further provided.

The terminal 26 is configured to include a charger-side positive terminal 21, a charger-side negative terminal 22, and charger-side signal terminal groups 23. The terminals 21 and 22 are configured to supply the direct-current charging power source to the battery pack 10. The signal terminal groups 23 are composed of a plurality of terminals including at least a charger-side control voltage output terminal 81 and a charge permission/stop signal input terminal 82 (see FIG. 2).

The battery charger 20 further includes a display portion 28 provided with three LEDs. The display portion 28 externally indicates an operational state of the battery charger 20, a charging status of the battery pack 10, and the like.

In the charging system 30 for electric power tool constituted as above, when the battery-side attachment portion 17 of the battery pack 10 is attached to the charger-side attachment portion 27 of the battery charger 20, both of the terminals 16 and 26 are electrically connected to each other.

More particularly, the terminal 11 of the battery pack 10 is connected to the terminal 21 of the battery charger 20. The terminal 12 of the battery pack 10 is connected to the terminal 22 of the battery charger 20. Moreover, the terminals 51 and 52 constituting the signal terminal groups 13 are connected to the terminals 81 and 82 constituting the signal terminal groups 23, respectively (see FIG. 2). In this state, it becomes possible to charge the battery 31 inside the battery pack 10 by the battery charger 20.

(2) Electrical Configuration of Charging System for Electric Power Tool

Figure 2:
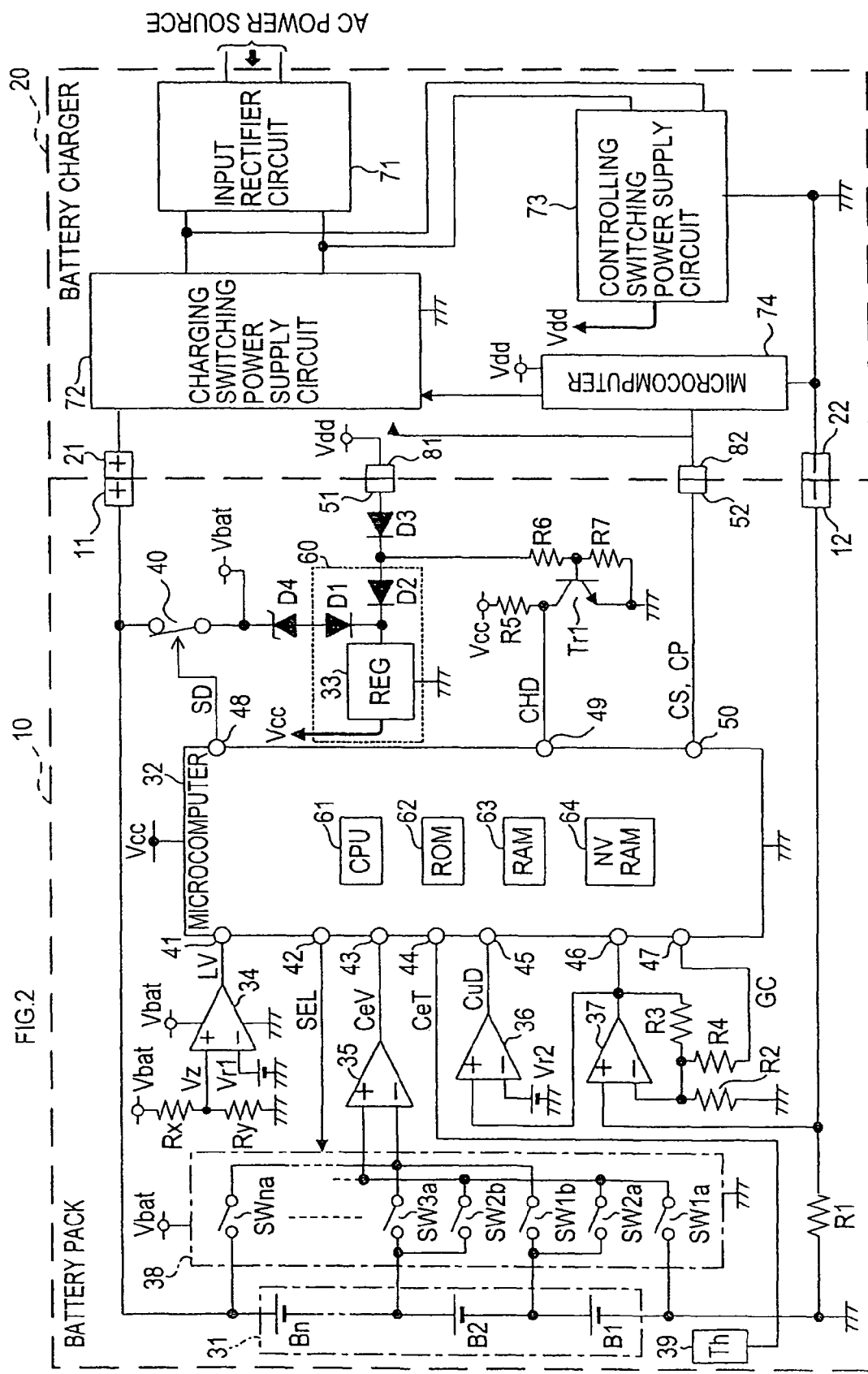
FIG. 2 is an electric circuit diagram showing an electrical configuration of the charging system for electric power tool.

An electrical configuration of the charging system 30 for electric power tool will now be described with reference to FIG. 2. FIG. 2 shows a state in which the battery pack 10 is attached to the battery charger 20. In FIG. 2, the battery pack 10 and the battery charger 20 are electrically connected to each other.

(2-1) Electrical Configuration of Battery Pack

Firstly, an electrical configuration of the battery pack 10 will be described. As shown in FIG. 2, the battery pack 10 includes the battery 31, a microcomputer 32 and a battery-side regulator 33. The microcomputer 32 collectively carries various controlling functions in the battery pack 10. In particular, the microcomputer 32, for example, controls a charge/discharge of the battery 31 and monitors a status of the battery 31. The regulator 33 generates a battery-side control voltage Vcc (e.g., 3.3 V) using electric power of the battery 31 as input for operating various circuits inside the battery pack 10. The terminal 11 is connected to a positive side of the battery 31. The terminal 12 is connected to a negative side of the battery 31.

The battery 31 is configured by connecting a plurality of battery cells B1, B2, . . . , and Bn in series. In the present embodiment, respective battery cells B1, B2, . . . , and Bn each can be lithium-ion rechargeable batteries having a normal voltage of 3.6 V, and four lithium-ion rechargeable batteries can be connected in series. Therefore, in this example, a total voltage of the battery 31 (hereinafter referred to as "battery voltage") Vbat is approximately 14.4 V in a normal state.

When the battery pack 10 attached to the power tool body is used, the electric power of the battery 31 is supplied to the tool body via the terminals 11 and 12. When the battery 31 is charged by the battery charger 20, the direct-current charging power source from the battery charger 20 is supplied to the battery 31 via the terminals 11 and 12, as explained later.

The battery voltage Vbat is inputted to the regulator 33 through a shutdown switch 40, a Zener diode D4, and a diode D1. The regulator 33 generates the control voltage Vcc based on the inputted battery voltage Vbat. The Zener diode D4 has a cathode connected to one end of the shutdown switch 40. The Zener diode D4 has an anode connected to an anode of the diode D1. The diode D1 has a cathode connected to the regulator 33.

The shutdown switch 40 is turned on/off in accordance with a shutdown signal SD from the microcomputer 32. Details of the on/off control will be described later. The shutdown switch 40 is generally turned on as long as the battery 31 is in a normal state.

Therefore, the battery voltage Vbat is generally inputted to the regulator 33 through the shutdown switch 40, the Zener diode D4, and the diode D1. However, there may be voltage drops caused by a reverse voltage (breakdown voltage; e.g., 5 V) of the Zener diode D4 and by a forward voltage of the diode D1. Accordingly, in practice, a voltage obtained by deducting amounts of such voltage drops from the battery voltage Vbat is inputted to the regulator 33.

In the battery pack 10, as shown in FIG. 2, a circuit operated with the control voltage Vcc and a circuit operated with the battery voltage Vbat are present in a mixed manner. The battery voltage Vbat inputted through the shutdown switch 40 is inputted to the cathode of the Zener diode D4. The battery voltage Vbat is also inputted to each circuit inside the battery pack 10, which is to be operated with the battery voltage Vbat.

Not only the above described battery voltage Vbat, but also a charger-side control voltage Vdd (which is explained later in detail) is inputted to the regulator 33 via a diode D3 and a diode D2. The control voltage Vdd is generated inside the battery charger 20.

Specifically, the cathode of the diode D1 and a cathode of the diode D2 both are connected to an input side of the regulator 33. An anode of the diode D2 is connected to a cathode of the diode D3. An anode of the diode D3 is connected to the terminal 51. As explained later, the control voltage Vdd is inputted to the terminal 51 from the battery charger 20. Therefore, the control voltage Vdd inputted to the terminal 51 is inputted to the regulator 33 via the diode D3 and the diode D2.

That is to say, in the battery pack 10 of the present embodiment, it is configured that the regulator 33 can generate the control voltage Vcc based on one of the battery voltage Vbat and the control voltage Vdd. In other words, the regulator 33 is configured to be a so-called dropper type regulator. More specifically, it is configured that the battery voltage Vbat is inputted to the regulator 33 via the diode D1, and the control voltage Vdd is inputted to the regulator 33 via the diode D2. As a result, a greater one of the battery voltage Vbat and the control voltage Vdd is to be inputted to the regulator 33.

According to the above configuration, in a normal state when the battery 31 is normal, the battery voltage Vbat is inputted to the regulator 33 via the diode D1. Based on the inputted battery voltage Vbat, the control voltage Vcc can be generated.

However, if discharging of the battery 31 continues, for example, due to the battery pack 10 being left unused for a long period of time, the battery voltage Vbat is decreased. In this case, the regulator 33 may not be able to correctly generate the control voltage Vcc based on the decreased battery voltage Vbat.

In such case, in the present embodiment, if the battery pack 10 is attached to the battery charger 20, the control voltage Vdd from the battery charger 20 is inputted to the regulator 33 via the diode D2, thereby allowing the regulator 33 to generate the control voltage Vcc based on the inputted control voltage Vdd.

More specifically, in the present embodiment, overdischarging of the battery 31 is detected based on an under-voltage detection signal LV (which is explained later in detail) from an under-voltage detecting comparator 34. If the over-discharging is detected, the microcomputer 32 outputs the shutdown signal from a shutdown signal output terminal to turn off the shutdown switch 40. Then, input of the battery voltage Vbat to the regulator 33 is interrupted, and thereby, generation of the control voltage Vcc is stopped. Accordingly, the microcomputer 32 is switched to a shutdown mode in which operation of the microcomputer 32 itself is also stopped.

In order to recover the microcomputer 32 from the shutdown mode to a normal operational state (a normal operation mode), it is necessary that charging is performed with the battery pack 10 attached to the battery charger 20. When the battery pack 10 is attached to the battery charger 20, the control voltage Vdd is inputted to the regulator 33 via the terminal 51, the diode D3, and the diode D2. Consequently, generation of the control voltage Vcc is initiated. Thus, the microcomputer 32 starts operating and then recovers to the normal operation mode.

After recovering to the normal operation mode, the microcomputer 32 turns on the shutdown switch 40 again. Therefore, after the shutdown switch 40 is turned on, if charging is continued and an amount of the battery voltage Vbat is recovered, the regulator 33 generates the control voltage Vcc again based on the recovered battery voltage Vbat.

In the meantime, there is a power circuit 60 including the regulator 33, two diodes, i.e., the diodes D1 and D2, and the like. The diodes D1 and D2 are connected to the input side of the regulator 33. If a failure (e.g., failure of the diode D2) occurs in the power circuit 60, the battery voltage Vbat to be inputted to the regulator 33 may also be applied to the terminal 51. Moreover, in this case, the battery voltage Vbat may be inputted even to the battery charger 20. If the battery voltage Vbat is inputted to the battery charger 20, adverse effect may be caused to a circuit (e.g., a controlling switching power supply circuit 73 for generating the control voltage Vdd) inside the battery charger 20.

In view of the above, the battery pack 10 of the present embodiment is configured such that the diode D3 is connected to the terminal 51, and thereby, the control voltage Vdd from the battery charger 20 is inputted via the diode D3 to the regulator 33. Providing the diode D3 as above makes it possible to inhibit the battery voltage Vbat from being inputted to the battery charger 20 via the terminal 51.

The battery pack 10 further includes a cell selecting switch 38, a differential amplifying circuit 35, a temperature detecting circuit 39, the under-voltage detecting comparator 34, a current detecting resistor R1, a non-inverting amplifying circuit, a discharge detecting comparator 36, and a charger detecting transistor Tr1.

The switch 38 selectively outputs one of voltages (hereinafter referred to as "cell voltage") of the battery cells B1, B2, . . . , Bn in the battery 31.

The circuit 35 amplifies a voltage of the one of the battery cells selected by the switch 38, and outputs the amplified voltage as a cell voltage signal CeV.

The circuit 39 is provided in the vicinity of the battery 31. The circuit 39 detects a temperature of the battery cell (hereinafter referred to as "cell temperature") and outputs the temperature as a cell temperature signal CeT.

The comparator 34 compares a divided battery voltage value Vz obtained by dividing the battery voltage Vbat by voltage divider resistors Rx and Ry with a predetermined first reference voltage Vr1. Then the comparator 34 outputs the comparison result as the under-voltage detection signal LV.

The resistor R1 is used to detect a discharge current at the time of discharge from the battery 31 to the power tool body.

The non-inverting amplifying circuit includes an operational amplifier 37 and resistors R2, R3, and R4. The non-inverting amplifying circuit is used to generate a discharge current signal by amplifying the current detected by the resistor R1 (i.e., a voltage signal corresponding to a current value) with a predetermined gain.

The comparator 36 compares the discharge current signal amplified by the non-inverting amplifying circuit with a predetermined second reference voltage Vr2. Then, the comparator 36 outputs the comparison result as a discharge detection signal CuD.

The transistor Tr1 is used to detect that the battery charger 20 is connected.

As the transistor Tr1, an NPN-type bipolar transistor is used in the present embodiment by way of example only.

The cell selecting switch 38 is operated with the battery voltage Vbat. The switch 38 is configured so that, in accordance with a cell selection signal SEL from the microcomputer 32, a voltage in one of the battery cells indicated by the cell selection signal is outputted and then inputted to the circuit 35. As illustrated, the cell selecting switch 38 includes a plurality of switches SW1$a$, SW2$a$, SW1$b$, SW2$b$, SW3$a$, . . . , SWn$a$.

The switch SW1$a$ is connected between a negative electrode of the battery cell B1 and a non-inverting input terminal of the circuit 35. The switch SW1$b$ is connected between a positive electrode of the battery cell B1 and an inverting input terminal of the circuit 35. In the cell selecting switch 38 configured as above, in a case, for example, where the battery cell B1 with the lowest potential is selected by the cell selection signal SEL, the switches SW1$a$ and SW1$b$ are turned on, and the other switches are all turned off. As a result, a voltage of the selected battery cell B1 is inputted from the cell selecting switch 38 to the circuit 35.

The circuit 35 is operated with the control voltage Vcc. The voltage inputted from the cell selecting switch 38 (i.e., a potential difference of the selected any one of the battery cells) is amplified by the circuit 35 and inputted to the microcomputer 32 as a cell voltage signal CeV.

The circuit 39 is configured as a known temperature sensor including a thermo-sensitive device such as a thermistor. The thermo-sensitive device is provided in the vicinity of each battery cell in the battery 31. Various configurations can be used as to where the thermo-sensitive device is to be provided or how many thermo-sensitive devices are to be provided. For example, one thermo-sensitive device may be provided and a detection result based on the device may be regarded as a cell temperature of each battery cell. Alternatively, thermo-sensitive devices may be separately provided for each of the battery cells, and a cell temperature may be individually detected with respect to each battery cell. In the present embodiment, explanation is given based on the former (the case where one thermo-sensitive device is provided) to simplify the description.

The comparator 34 is operated with the battery voltage Vbat (or the control voltage Vcc). The comparator 34 outputs the under-voltage detection signal of high (H) level to the microcomputer 32 in a normal state where the divided battery voltage value Vz is equal to or greater than the first reference voltage Vr1. On the other hand, in a case where the battery voltage Vbat is decreased, and the voltage value Vz thereby falls below the voltage Vr1, the comparator 34 outputs the under-voltage detection signal of low (L) level to the microcomputer 32. The comparator 34 is intended to inhibit overdischarge of the battery 31, and detects when the battery 31 is almost in an overdischarge state. Accordingly, the voltage Vr1 is appropriately set to a value which makes it possible to detect when the battery 31 is almost in the overdischarge state. In the present embodiment, by way of example, in order to detect when the battery voltage Vbat falls below 10 V, the voltage Vr1 is set to a value obtained by dividing 10 V by the resistors Rx and Ry.

The resistor R1 is provided on a current-carrying path extending from the terminal 12 to a negative electrode of the battery 31 (a negative electrode of the battery cell B1 with the lowest potential). A voltage drop (a voltage signal) caused by a discharge current at the resistor R1 is inputted to the operational amplifier 37 which constitutes the non-inverting amplifying circuit.

The non-inverting amplifying circuit basically includes the operational amplifier 37 which is operated with the control voltage Vcc, and has a known configuration. The voltage signal detected by the resistor R1 is inputted to the non-inverting input terminal. The inverting input terminal is connected to a ground line (a ground potential) through the resistor R2. The inverting input terminal is also connected to an output terminal through the resistor R3. In the present embodiment, which has the above configuration as a basis, the resistor R4 is further connected between the inverting input terminal and the microcomputer 32. The gain of the non-inverting amplifying circuit can be switched between two levels with this configuration.

One end of the resistor R4 is connected to the inverting input terminal of the operational amplifier 37, and the other end is connected to a gain switch signal output port 47 of the microcomputer 32. The microcomputer 32 achieves gain switching of the non-inverting amplifying circuit by switching the port 47 between a high impedance and an L-level output.

When an amount of the discharge current is larger, e.g., at the time when the electric power tool is in use, a high impedance signal is outputted as a gain switch signal GC to reduce the gain (the reduced gain is hereinafter referred to as a first gain). This makes it possible to appropriately detect a large amount of discharge current (e.g., a heavy current of several tens of amperes). On the other hand, when an amount of the discharge current has a small value (e.g., approximately 0 A), an L-level signal is outputted as a gain switch signal GC to increase the gain of the non-inverting amplifying circuit (the increased gain is hereinafter referred to as a second gain). This makes it possible to accurately detect even a very small electric current. As above, by switching the gain of the non-inverting amplifying circuit in accordance with the value of the discharge current, the microcomputer 32 is able to appropriately detect a discharge current regardless of the amount of such discharge current.

The comparator 36 is operated with the control voltage Vcc. The comparator 36 outputs the discharge detection signal CuD of H level to the microcomputer 32 in a case where the discharge current signal outputted from the operational amplifier 37 is equal to or greater than the second reference voltage Vr2. On the other hand, in a case where the discharge current signal outputted from the operational amplifier 37 is smaller than the voltage Vr2, the comparator 36 outputs the discharge detection signal CuD of L level to the microcomputer 32. The comparator 36 is intended to detect when power supply to the power tool body is started.

When the power supply to the power tool body is started, the discharge current is increased immediately due to properties of a load (for example, a motor), and is brought into a steady state before long. Therefore, the voltage Vr2, which is a criterion for detecting discharge, may be set to various values. For example, the voltage Vr2 may be set as a voltage corresponding to a current value close to a current value in the steady state (e.g., several tens of amperes) or a voltage corresponding to a current value approximately one half of the current value in the steady state. In the present embodiment, however, the voltage Vr2 is set to a lower value (e.g., a voltage corresponding to 1 A) so that the discharge can be detected quickly without a need to wait for the steady state to be attained after the discharge is started.

The discharge current signal inputted to the comparator 36 is inputted from the non-inverting amplifying circuit including the operational amplifier 37. The discharge current signal varies in level depending on the gain of the non-inverting amplifying circuit as described above. In such a configuration, on a condition that the gain of the non-inverting amplifying circuit remains fixed to the first gain, by which a heavy current can be appropriately detected, it would be difficult to accurately detect a small amount of discharge current (e.g., several amperes), for example during low-speed running of the motor.

In the present embodiment, therefore, the microcomputer 32 switches the gain of the non-inverting amplifying circuit to the second gain when the discharge is finished. Even a small amount of the discharge current can be thereby detected. That is, the gain is set high enough for a small current to be adequately detected. And then, when the start of the discharge is detected, the gain is again switched to the first gain, whereby a heavy current can be adequately detected.

A purpose of allowing the gain of the non-inverting amplifying circuit to be switchable as such is basically to make it possible to accurately detect even a small amount of current as described above. A further purpose is to facilitate a quick recovery (wake-up) of the microcomputer 32 from a sleep mode to a normal operational state when the discharge is restarted after the monitoring circuit enters the sleep mode as described later. Switching to the second gain at the end of the discharge makes it possible to accurately detect when the discharge is restarted, even when the current value is small, for example during low-speed running of the motor, and to wake up the monitoring circuit more quickly.

In the transistor Tr1, a base is connected to the terminal 51 via a resistor R6 and the diode D3, an emitter is connected to a ground potential, and a collector is connected to the control voltage Vcc through a resistor R5. The collector is also connected to a charger connection detection signal input port 49 of the microcomputer 32.

When the battery pack 10 is attached to the battery charger 20, the control voltage Vdd generated inside the battery charger 20 is inputted to the regulator 33 via the diode D2 as described above. The control voltage Vdd is further inputted as a charger connection signal to the base of the transistor Tr1 via the resistor R6. As a result, the transistor Tr1 is turned on. Also, a potential of the collector of the transistor Tr1, that is, a charger connection detection signal CHD to be inputted to the microcomputer 32, becomes L level.

When the battery charger 20 is not connected to the battery pack 10, the transistor Tr1 is turned off. Also, the charger connection detection signal CHD to be inputted to the microcomputer 32 becomes H level due to the control voltage Vcc to be inputted through the resistor R5. On the other hand, when the battery charger 20 is connected to the battery pack 10, the transistor Tr1 is turned on as above due to the charger connection signal (voltage Vdd) from the battery charger 20, whereby the charger connection detection signal CHD to be inputted to the microcomputer 32 becomes L level. Therefore, the microcomputer 32 can determine whether or not the battery charger 20 is connected based on a level of the charger connection detection signal CHD.

The microcomputer 32 has a known configuration including therein a CPU 61, a ROM 62, a RAM 63, an NVRAM (a nonvolatile memory) 64, and the like as hardware. The microcomputer 32 is operated with the control voltage Vcc generated by the regulator 33. The microcomputer 32 performs various controls in accordance with various programs stored in the ROM 62.

The microcomputer 32 includes following ports to/from which signals are inputted/outputted: an under-voltage detection signal input port 41, a cell selection signal output port 42, a cell voltage signal input port 43, a cell temperature signal input port 44, a discharge detection signal input port 45, a discharge current signal input port 46, the gain switch signal output port 47, a shutdown signal output port 48, the charger connection detection signal input port 49, a charge permission/stop signal output port 50, and the like.

The under-voltage detection signal LV from the comparator 34 is inputted to the port 41. The cell selection signal SEL to the cell selecting switch 38 is outputted from the port 42. The cell voltage signal CeV from the circuit 35 is inputted to the port 43. The cell temperature signal CeT from the circuit 39 is inputted to the port 44. The discharge detection signal CuD from the comparator 36 is inputted to the port 45. The discharge current signal from the operational amplifier 37 is inputted to the port 46. The gain switch signal GC is outputted from the port 47. The shutdown signal SD controlling the shutdown switch 40 is outputted from the port 48. The charger connection detection signal CHD from the transistor Tr1 is inputted to the port 49. A charge permission/stop signal (a charge permission signal CP and a charge stop signal CS) to the battery charger 20 is outputted from the port 50.

In later-explained control processes for charge monitoring (see FIG. 4), the microcomputer 32 appropriately outputs the charge permission signal CP or the charge stop signal CS to permit or stop a generation (or an output) of charging power in the battery charger 20.

Specifically, when charging is permitted, the charge permission signal CP is outputted. Then, the outputted signal CP is inputted from the terminal 52 of the battery pack 10 to a charging switching power supply circuit 72 inside the battery charger 20 via the terminal 82 of the battery charger 20. This allows the circuit 72 to generate (or output) charging power.

On the other hand, when charging is stopped, the charge stop signal CS is outputted. Then, the circuit 72 inside the battery charger 20 stops generating (or outputting) the charging power in accordance with the outputted signal CS.

(2-2) Electrical Configuration of Battery Charger

An electrical configuration of the battery charger 20 will be explained. The battery charger 20 includes an input rectifier circuit 71, the charging switching power supply circuit 72, the controlling switching power supply circuit 73, a microcomputer 74, the charger-side control voltage output terminal 81, and the charge permission/stop signal input terminal 82.

The input rectifier circuit 71 rectifies an external power source (in the present embodiment, an AC 100 V power source) into a direct current power source.

The circuit 72 generates charging power for charging the battery 31 from the direct current power source rectified by the circuit 71.

The circuit 73 generates the charger-side control voltage Vdd from the direct current power source rectified by the circuit 71. The control voltage Vdd is to operate various circuits inside the battery charger 20.

The microcomputer 74 controls generation of the charging power by the circuit 72. In other words, the microcomputer 74 controls charging of the battery 31.

The terminal 81 outputs the control voltage Vdd to the battery pack 10.

The terminal 82 is a terminal to which the charge permission signal CP or the charge stop signal CS from the battery pack 10 is inputted.

The battery charger 20 of the present embodiment is configured to perform charging of the battery 31 by a constant current control or a constant voltage control. Switching between the above controls is performed in accordance with a charge control command from the microcomputer 74. Thus, when charging is performed by the constant current control, the circuit 72 generates charging current having a constant current value as charging power. Then, the generated charging current is supplied to the battery pack 10. On the other hand, when charging is performed by the constant voltage control, the circuit 72 generates charging voltage having a constant voltage value as charging power. Then, the generated voltage is supplied to the battery pack 10.

The charging power generated by the circuit 72 is supplied to the battery pack 10 via the charger-side positive terminal 21 and the charger-side negative terminal 22 of the battery charger 20.

Although not shown in the drawings, the microcomputer 74 of the battery charger 20 has a known configuration including therein a CPU, a ROM, a RAM, a NVRAM, and the like as hardware. The microcomputer 74 is operated with the control voltage Vdd generated by the circuit 73. The microcomputer 74 performs various controls in accordance with various programs stored in the ROM.

The control voltage Vdd generated by the circuit 73 is also outputted to the battery pack 10 from the terminal 81. That is to say, when the battery pack 10 is attached to the battery charger 20, the terminal 51 of the battery pack 10 is connected to the terminal 81. As a result, the control voltage Vdd generated inside the battery charger 20 is inputted to the battery pack 10 via the terminals 81 and 51.

In addition, when the battery pack 10 is attached to the battery charger 20, the terminal 52 of the battery pack 10 is connected to the terminal 82 of the battery charger 20. As a result, the charge permission signal CP or the charge stop signal CS outputted from the microcomputer 32 inside the battery pack 10 is inputted to the circuit 72 inside the battery charger 20 via the terminals 52 and 82.

Generation (or output) of the charging power by the circuit 72 is controlled by the charge permission signal CP or the charge stop signal CS from the battery pack 10. Specifically, when the signal CP is outputted from the battery pack 10, the circuit 72 generates the charging power, and then, outputs the charging power to the battery pack 10. On the other hand, when the signal CS is outputted from the battery pack 10, the circuit 72 stops generation (or output) of the charging power, so that the charging power cannot be inputted to the battery pack 10 (i.e., charging to the battery 31 is inhibited).

(3) Various Control Processes Executed in Battery Pack

In the battery pack 10 configured as such, the microcomputer 32 always monitors the battery 31 based on the cell temperature, the cell voltage of each battery cell, the electric current at the time of charge and discharge of the battery 31, and the like, while operating normally (in a normal operational state), except while in a sleep mode and a shutdown mode, which will be described later. Items to be monitored by the microcomputer 32 as to the battery 31 are not limited to the above cell voltage, cell temperature, and charge/discharge current, and other items may be monitored.

In a normal operational state, the battery 31 is variously monitored by the microcomputer 32.

On the other hand, if given conditions for switching the microcomputer 32 to a sleep mode are met, as in such a case where the power tool body is not receiving power supply, the microcomputer 32 switches the microcomputer 32 itself to a sleep mode. Electric power consumption of the battery 31 is thereby reduced compared to that during the normal operational state. In the sleep mode, however, power supply to each portion, including the microcomputer 32, inside the battery pack 10 is not completely stopped. Minimum necessary operations are continuously performed to return from the sleep mode and wake up.

Specifically, after switched to a sleep mode, the microcomputer 32 determines at least whether or not discharge is started based on the signal from the comparator 36; whether or not the battery charger 20 is connected based on the signal from the transistor Tr1; and whether or not the voltage value Vz falls below the voltage Vr1 (i.e., in the present example, whether or not the battery voltage Vbat falls below 10 V) based on the signal from the comparator 34.

Owing to this, if any of returning conditions, that is, a condition where discharge from the battery 31 is started, a condition where the battery charger 20 is connected, and a condition where the voltage value Vz falls below the voltage Vr1, are met after switched to a sleep mode, the microcomputer 32 is again returned from the sleep mode to a normal operational state. When returned due to start of discharge, the microcomputer 32 controls the discharge while monitoring a status of the battery 31, as will be described later. When returned due to connection of the battery charger 20, the microcomputer 32 enters a charge monitoring mode, and executes the control processes for charge monitoring including various controls related to charging, monitoring of the status of the battery 31 while charging, and the like. When returned due to decrease in the battery voltage, the microcomputer 32 is switched to the shutdown mode in which electric power consumption of the battery 31 is still less than that in the sleep mode.

Specifically, switch to the shutdown mode is performed by turning off the shutdown switch 40 in accordance with the shutdown signal. Therefore, in the shutdown mode, the battery voltage Vbat is not supplied at all to the entire monitoring circuit including the regulator 33 in the battery pack 10, whereby operations of the entire monitoring circuit including the microcomputer 32 are completely stopped.

The microcomputer 32 may be so configured as to continue the operations required for wake-up as described above even if the voltage value Vz falls below the voltage Vr1. In such a case, although electric power consumption is sufficiently lower than that in the normal operational state, the battery voltage is consumed slowly but steadily, whereby discharge of the battery 31 further proceeds and the battery 31 may be brought into an overdischarge state. In the present embodiment, therefore, when the voltage value Vz falls below the voltage Vr1, it is prioritized to inhibit overdischarge of the battery 31 over functions of the monitoring circuit. That is, the shutdown switch 40 is turned off, and the power supply from the battery 31 to each portion inside the battery pack 10 is thereby completely blocked.

However, even in the shutdown mode, a remaining battery capacity and the battery voltage Vbat are gradually decreased in the long term due to self discharge of the battery 31. If the battery voltage Vbat is further decreased, the control voltage Vcc generated by the regulator 33 is also decreased. Eventually, it becomes impossible to operate the microcomputer 32 by the battery 31. In this case, the microcomputer 32 cannot monitor the battery 31.

Thus, in the present embodiment, the following configuration is made. That is, even if the battery voltage Vbat is decreased such that the control voltage Vcc required for operating the microcomputer 32 cannot be generated, the microcomputer 32 can be operational with the control voltage Vdd from the battery charger 20 when the battery pack 10 is attached to the battery charger 20. As above, even in a case that the battery voltage Vbat is significantly decreased, monitoring of the battery 31 can be performed by operating the microcomputer 32 during charging.

(3-1) Explanations of Control Processes for Battery Monitoring

Figure 3B:
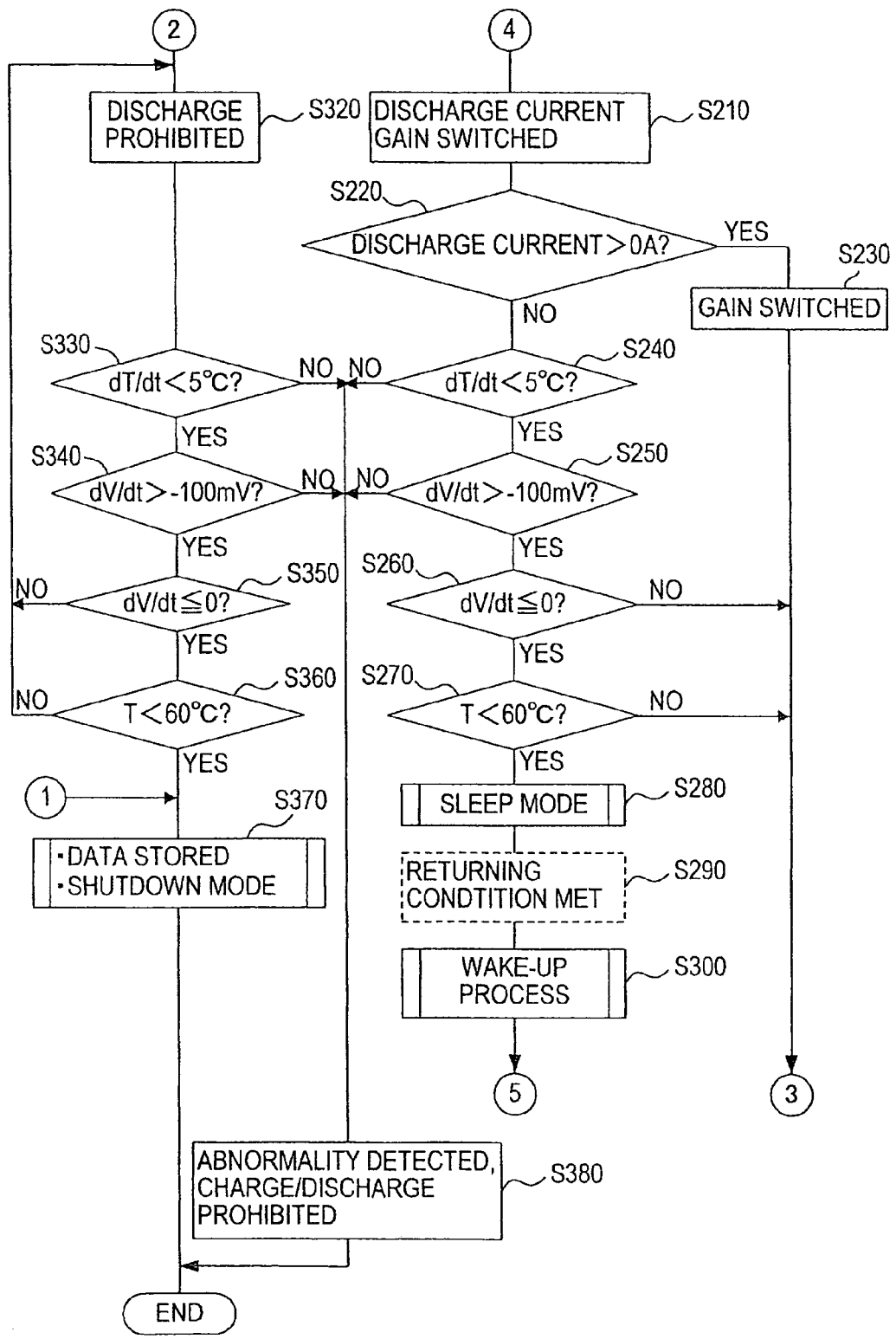

Hereinafter, explanation is given with reference to FIGS. 3A and 3B on control processes for battery monitoring, which are performed by the microcomputer 32, in the battery pack 10 of the present embodiment configured as above. In the microcomputer 32 inside the battery pack 10, the CPU 61 reads out a control process program from the ROM 62, and executes the processes in accordance with the program.

When the control processes for battery monitoring are started, it is initially determined whether or not the battery charger 20 is connected (S110) based on the signal CHD inputted to the port 49 of the microcomputer 32.

When the battery charger 20 is determined to be connected (S110: YES), the monitoring circuit including the microcomputer 32 inside the battery pack 10 enters a charge monitoring mode to execute the control processes for charge monitoring (S120). In the charge monitoring mode, the microcomputer 32 sets a charge monitoring mode flag in the RAM 63. The microcomputer 32 also controls charging to the battery 31 while monitoring the status of the battery 31, by executing the control processes for charge monitoring. Details of the control processes for charge monitoring will be explained later with reference to FIG. 4.

On the other hand, when the battery charger 20 is determined not to be connected (S110: NO), it is determined whether or not the battery voltage Vbat is lower than 10 V (S130) based on the signal from the comparator 34. When the battery voltage Vbat is determined to be lower than 10 V (S130: YES), the monitoring circuit is switched to a shutdown mode (S370) after data storage is performed because the battery 31 may be brought into an overcharging state. That is, the power supply from the battery 31 to the battery pack 10 is completely stopped by turning off the shutdown switch 40.

The above data storage refers to storing various data into the NVRAM 64 from the microcomputer 32 (for example, from the RAM 63 and the like) in which the various data has been held. The various data can include, for example, various histories such as the number of charging, the highest and the lowest values of the cell temperature, the largest and the smallest values of the discharge current.

After entering the shutdown mode as above, the shutdown mode is maintained unless the battery charger 20 is connected and charging is thereby started. When the battery charger 20 is connected, the control voltage Vdd inside the battery charger 20 is inputted to the regulator 33 through the diode D3 and the diode D2. The regulator 33 thereby starts to generate the control voltage Vcc from the control voltage Vdd. The generated control voltage Vcc is inputted to the microcomputer 32, which thereby starts to perform various controls (normal operations) including the control processes for battery monitoring.

When the battery voltage Vbat is determined to be 10 V or higher (S130: NO) in the determination process in S130, each of the battery cells B1, B2, ..., and Bn is determined whether or not to have a cell voltage of lower than 2.0 V (S140). When the cell voltages of all the battery cells are 2.0 V or higher (S140: NO), a status check is performed (S150). On the other hand, when any one of the battery cells has a cell voltage of lower than 2.0 V (S140: YES), the monitoring circuit enters a no-discharge mode (S320).

Specifically, the microcomputer 32 sets a no-discharge mode flag in the RAM 63 inside the microcomputer 32, as well as outputs a discharge stop signal to the power tool body. As a result, energization to a load (such as a motor) inside the power tool body (i.e., discharge from the battery 31) is stopped.

In the status check in S150, various data are obtained showing the status of the battery 31 such as the battery voltage Vbat, the cell voltage, the cell temperature, the discharge current, and the like.

Then, it is determined whether or not the discharge current is greater than 80 A (S160) based on the signal inputted to the port 46. When the discharge current is greater than 80 A (S160: YES), the monitoring circuit enters a discharge stop mode (S310). In the discharge stop mode, specifically, the microcomputer 32 sets a discharge stop mode flag in the RAM 63 inside the microcomputer 32, as well as outputs the discharge stop signal as in the no-discharge mode in S320. The discharge from the battery 31 to the power tool body is thereby stopped, and the process again returns to the status check in S150.

When the discharge current is 80 A or less (S160: NO), it is determined whether or not the cell temperature is higher than 80° C. (S170) based on the signal inputted to the port 44. When the cell temperature is higher than 80° C. (S170: YES), the monitoring circuit enters the discharge stop mode (S310) and the process again returns to the status check in S150. On the other hand, when the cell temperature is 80° C. or lower (S170: NO), it is determined again whether or not the cell voltage is lower than 2.0 V (S180) in the same manner as in S140. When any one of the voltage cells has a cell voltage of lower than 2.0 V (S180: YES), the monitoring circuit enters a no-discharge mode (S320), whereas when all the battery cells are 2.0 V or higher (S180: NO), the monitoring circuit enters a discharge permissive mode (S190). Specifically, the microcomputer 32 sets a discharge permissive mode flag in the RAM 63.

After entering the discharge permissive mode, the battery 31 continues to be monitored by the microcomputer 32 as well. Specifically, after switched to the discharge permissive mode in S190, it is initially determined whether or not the discharge current becomes 0 A (S200). During discharge, i.e., while the electric power tool is in use, the discharge is continuing (S200: NO) and the process again returns to the status check in S150. On the other hand, when the discharge current becomes 0 A (S200: YES), the microcomputer 32 outputs the signal of L level from the port 47. Then, the gain of the non-inverting amplifying circuit, which includes the operational amplifier 37 and others, is switched from the first gain in an initial state to the second gain which is greater than the first gain (S210).

This makes it possible, when the discharge is restarted next time, to quickly detect the restart of the discharge even when the current value is still small, for example during low-speed running of the motor. In determining whether or not the discharge current is 0 A in S200, the discharge current from the battery 31 does not have to be entirely 0 A, but 0 A here means a state where the discharge of the battery 31 accompanying the power supply to the power tool body is finished (i.e., a state where the power supply to the power tool body becomes 0 A). In practice, therefore, a prescribed current value for determining the termination of discharge may be set based on electric power consumed in each circuit including the microcomputer 32 inside the battery pack 10. When the discharge current is equal to or less than the prescribed current value, the battery 31 may be determined to be finished with the discharge. The process proceeds to S210 after the process of S200.

After the gain of the non-inverting amplifying circuit is switched to the second gain in S210, which enables even relatively small discharge current to be accurately detected, it is determined again whether or not the discharge current is greater than 0 A (S220). In other words, it is determined for confirmation following S200 whether or not the discharge from the battery 31 to the power tool body is finished.

Here, when it is determined that the discharge current is greater than 0 A and the discharge is continuing (S220: YES), the microcomputer 32 again switches the gain of the non-inverting amplifying circuit to the first gain (S230) and the process returns to S150. On the other hand, when the discharge current is determined to be 0 A (S220: NO), the discharge is considered to be finished and the process proceeds to S240-S270 in order to determine whether or not conditions for entering a sleep mode are met, in other words, whether or not the battery 31 is in a stable state.

Specifically, it is initially determined, concerning the cell temperature, whether or not an amount of change in the cell temperature dT/dt is less than, for example, 5° C. (S240). If the battery 31 is in a normal state, the cell temperature should gradually drop after the discharge is finished. In an unstable state after the discharge is finished before the battery 31 becomes stable, however, if something abnormal occurs in a battery cell, such as a slight short circuit in the battery cell as described earlier, the cell temperature rises sharply. By conducting the process of S240, it is made possible to detect the abnormality of the battery cell by detecting such a sharp rise in the cell temperature accompanying the abnormality of the battery cell.

When the amount of change in the cell temperature dT/dt is 5° C. or more (S240: NO), the battery cell is determined to be in an abnormal state (abnormality detection) and the monitoring circuit is switched to a no charge/discharge mode (S380) in which both charge and discharge are prohibited. After switched to the no charge/discharge mode, the battery pack 10 is unable to be charged and discharged, whereby a user can no longer use the battery pack 10.

When the amount of change in the cell temperature dT/dt is determined to be less than 5° C. (S240: YES), it is subsequently determined whether or not an amount of change in the cell voltage dV/dt of each of the battery cells is greater than, for example, −100 mV (S250). If, for example, a slight short circuit occurs in a battery cell, the voltage thereof drops sharply. By conducting the process of S250, it is made possible to detect the abnormality of the battery cell by detecting such a sharp drop in the cell voltage accompanying the abnormality of the battery cell.

When the amount of change in the cell voltage dV/dt is determined to be −100 mV or less in any one of the battery cells (S250: NO), in other words, when exhibiting a large declining tendency in the cell voltage, the battery cell is determined to be in an abnormal state and the monitoring circuit is switched to a no charge/discharge mode (S380) in which both charge and discharge are prohibited.

When the amount of change in the cell voltage dV/dt is determined to be greater than −100 mV in all the battery cells (S250: YES), in other words, when exhibiting a small declining tendency in the cell voltage, it is subsequently determined whether or not the amount of change in the cell voltage dV/dt is 0 or less in each of the battery cells (S260). When the amount of change in the cell voltage dV/dt is greater than 0 (S260: NO), in other words, when the cell voltage is rising, it is determined that, although nothing abnormal occurs in the battery cells, the battery 31 is in an unstable state immediately after the discharge is finished, and the process again returns to S150.

On the other hand, when the amount of change in the cell voltage dV/dt is 0 or less, in other words, when it is determined that a rise in the cell voltage after the discharge settles down and that the battery 31 is becoming stable (S260: YES), it is subsequently determined whether or not the cell temperature T is lower than 60° C. (S270). This determination in S270 is different from the determination based on the amount of change in the cell temperature in S240. The determination in S270 is the determination based on the value of the cell temperature itself. When the cell temperature is 60° C. or higher (S270: NO), the battery 31 is determined yet to be in an unstable state, and the process again returns to S150. On the other hand, when the cell temperature is determined to be lower than 60° C. (S270: YES), the microcomputer 32 considers that conditions for switching to a sleep mode are met, and switches the microcomputer 32 itself to a sleep mode (S280).

In the sleep mode, various monitoring operations (including a monitoring of the cell voltage, a monitoring of the cell temperature, and a monitoring of the charge/discharge current) performed in the microcomputer 32 during the normal operational state are basically stopped, and various controls by the microcomputer 32 are also basically stopped. However, operations required at least to return from the sleep mode to the normal operational state again are continuously performed as described above.

After switched to the sleep mode, if any of the returning conditions are met (S290), the monitoring circuit wakes up from the sleep mode to a normal operational state (S300), and the processes in S110 and thereafter are performed again. The above returning conditions include the condition where discharge from the battery 31 is started, the condition where the battery charger 20 is connected, and the condition where the battery voltage Vbat falls below 10 V. In the wake-up process in S300, a process for returning the gain, which has been switched to the second gain in S210, to the first gain is also performed.

For example, in the case where the monitoring circuit is returned from the sleep mode due to the connection of the battery charger 20 to the battery pack 10, the process proceeds from S110 to S120, and the monitoring circuit enters a charge monitoring mode to execute the control processes for charge monitoring.

Also, for example, in the case where the monitoring circuit is returned from the sleep mode due to the decrease in the battery voltage Vbat below 10 V, the process proceeds from S110 to S130. In S130, the battery voltage Vbat is determined to be lower than 10 V (S130: YES), and the process proceeds to S370, where storage of the data is performed and the monitoring circuit is switched to the shutdown mode.

After switched to the no-discharge mode in S320, the process proceeds to S330, where a determination process which is exactly the same as in S240 is performed. That is, it is determined whether or not the amount of change in the cell temperature dT/dt is less than 5° C. When the amount of change in the cell temperature dT/dt is 5° C. or greater (S330: NO), the battery cell is determined to be in an abnormal state, and the monitoring circuit is switched to the no charge/discharge mode (S3′80). On the other hand, when the amount of change in the cell temperature dT/dt is determined to be less than 5° C. (S330: YES), the process subsequently proceeds to S340. In S340, a determination process which is exactly the same as in S250 is performed, that is, it is determined whether or not the amount of change in the cell voltage dV/dt is greater than −100 mV in each of the battery cells.

When the amount of change in the cell voltage dV/dt is determined to be −100 mV or less in any one of the battery cells (S340: NO), in other words, when exhibiting a large declining tendency in the cell voltage, the battery cell is determined to be in an abnormal state and the monitoring circuit is switched to the no charge/discharge mode (S380). On the other hand, when the amount of change in the cell voltage dV/dt is determined to be greater than −100 mV in all the battery cells (S340: YES), in other words, when exhibiting a small declining tendency in the cell voltage, the process subsequently proceeds to S350. In S350, a determination process which is exactly the same as in S260 is performed, that is, it is determined whether or not the amount of change in the cell voltage dV/dt is 0 or less in each of the battery cells.

When the amount of change in the cell voltage dV/dt is greater than 0 (S350: NO), the process again returns to S320. On the other hand, when the amount of change in the cell voltage dV/dt is 0 or less (S350: YES), the process subsequently proceeds to S360. In S360, a determination process which is exactly the same as in S270 is performed, that is, it is determined whether or not the cell temperature T is lower than 60° C.

When the cell temperature is 60° C. or higher (S360: NO), the process again returns to S320. On the other hand, when the cell temperature is determined to be lower than 60° C. (S360: YES), the process proceeds to S370, where storage of the data is performed and the monitoring circuit is switched to the shutdown mode.

(3-2) Explanation of Control Processes for Charge Monitoring

Next, the control processes for charge monitoring of S120 in the control processes for battery monitoring shown in FIG. 3A will be explained in detail with reference to FIG. 4.

When the battery pack 10 is connected (attached) to the battery charger 20, the control processes for charge monitoring of S120 are started. Then, as shown in FIG. 4, it is determined whether or not the battery 31 is in a chargeable state (S410) by monitoring the status of the battery 31. This determination in S410 is made based on, for example, a past abnormality history stored in the NVRAM 64.

When the microcomputer 32 of the battery pack 10 detects abnormality of the battery 31 by a monitoring function which monitors the status of the battery 31, the microcomputer 32 stores, in the NVRAM 64, an abnormality history indicating that the battery 31 is inhibited from charging. In the determination process in S410, if the abnormality history is stored in the NVRAM 64, it is determined that charging of the battery 31 is impossible (S410: NO). Then, the charge stop signal CS is outputted to the battery charger 20 (S500). As a result, charging power is inhibited from being inputted to the battery 31 from the battery charger 20.

After a prescribed error handling process is performed (S510), the control processes for charge monitoring is ended, and then, the present process returns to S110 (see FIG. 3A). The prescribed error handling process is, for example, a process for storing, in the NVRAM 64, an abnormality history indicating that charging could not be performed due to abnormality of the battery 31.

On the other hand, when it is determined that the battery 31 is in a chargeable state in S410 (S410: YES), a status check of the battery 31 is performed (S420). The status check of the battery 31 includes, by way of example, a check of overdischarging of the battery 31 based on the under-voltage detection signal LV, a check of the voltage (cell voltage) of each of the battery cells B1, B2, . . . , Bn and the battery voltage Vbat, based on the cell voltage signal CeV, a check of the temperature of the battery 31 based on the cell temperature signal CeT, etc.

Based on a result of the status check in S420, whether or not the battery 31 is in a normal state is determined (S430). If the battery 31 is determined to be in an abnormal state in which the battery 31 should not be charged (S430: NO), for example, because a voltage of one of the battery cells B1, B2, . . . , Bn in the battery 31 is 0 V, the charge stop signal CS is outputted in S500. In the subsequent S510, an error handling process is performed.

In the determination process in S430, if the battery 31 is determined to be in a normal state (S430: YES), the charge permission signal CP is outputted to the battery charger 20 (S440). As a result, in the battery charger 20, the circuit 72 generates and outputs charging power. The charging power is then inputted to the battery pack 10, thereby initiating charging of the battery 31.

After the charging is started, monitoring shown in S450 to S470 is continued during charging. The processes of S450 to S460 are the same as those of S420 to S430 described above. In the processes of S450 to S460, whether or not the battery 31 is in a normal state is determined based on the status check of the battery 31.

In S470, it is determined whether or not charging of the battery 31 is completed. This determination is made as follows: a total amount of the cell voltage in each battery cell is obtained based on the cell voltage signal CeV of the each of the battery cells. Then, it is determined whether or not the obtained total amount (i.e., battery voltage Vbat) is a predetermined value (a value indicating a fully-charged state).

The processes in S450 to S470 are repeated until it is determined in S470 that the charging is completed. If it is determined that the charging is completed (S470: YES), the charge stop signal CS is outputted to the battery charger 20 (S480). When the signal CS is outputted, output of the charging power from the battery charger 20 is stopped, thereby stopping the charging of the battery 31. Then, a predetermined charging completion process (S490) is performed. Thereafter, the control processes for charge monitoring are ended, and the present process returns to S110 (see FIG. 3A).

(4) Effects of the Above Configuration

According to the above-described charging system 30 for electric power tool of the present embodiment, even if the battery voltage Vbat is decreased, for example, due to the battery pack 10 being left unused for a long period of time, the regulator 33 correctly generates the voltage Vcc based on, instead of the battery voltage Vbat, the voltage Vdd from the battery charger 20, and thereby allowing operating the microcomputer 32. Thus, when charging is performed to the battery 31 in which the battery voltage Vbat is decreased, the microcomputer 32 can perform a monitoring operation with the voltage Vdd from the battery charger 20, while allowing charging of the battery 31.

As another power source (an auxiliary power source) which may be provided in case of a decrease in the battery voltage Vbat, various methods may be adopted, other than using the control voltage Vdd inside the battery charger 20 as in the above embodiment.

In this regard, the battery charger 20 is originally provided with the power supply circuit 73. The circuit 73 generates the control voltage Vdd for operating the various circuits inside the battery charger 20. Also, it is especially necessary to monitor a status of the battery 31 at the time of charging the battery 31 by the battery charger 20.

Therefore, as in the above embodiment, it can be configured that when the battery pack 10 is connected to the battery charger 20, the control voltage Vdd inside the battery charger 20 is inputted also to the battery pack 10. This configuration makes it possible to simplify the configuration of supplying an auxiliary power source. In addition, it is possible to reliably monitor the battery 31 by operating the microcomputer 32, at least when the battery 31 is charged.

Also, the battery pack 10 and the battery charger 20 are provided with the respective terminals (the terminals 51 and 81) for inputting and outputting the control voltage Vdd. The terminals 51 and 81 are provided separately from the respective terminals 11 and 12, and 21 and 22 for inputting and outputting the charging power. As above, it is configured that the control voltage Vdd is inputted from the battery charger 20 to the battery pack via the terminals 51 and 81. By the above configuration, when the battery pack 10 is attached to the battery charger 20, the terminals 51 and 81 are connected to each other. Accordingly, the control voltage Vdd can be reliably supplied to the battery pack 10, thereby allowing the microcomputer 32 to reliably operate at the time of charging.

The control voltage Vdd inputted to the battery pack 10 from the battery charger 20 is not merely inputted to the regulator 33 in the battery pack 10. Also, the control voltage Vdd is used for the purpose of detecting that the battery pack 10 is connected (attached) to the battery charger 20. Therefore, it becomes possible to provide a charging system which allows a simple and effective detection of whether or not the battery pack 10 is attached to the battery charger 20.

Figure 4:
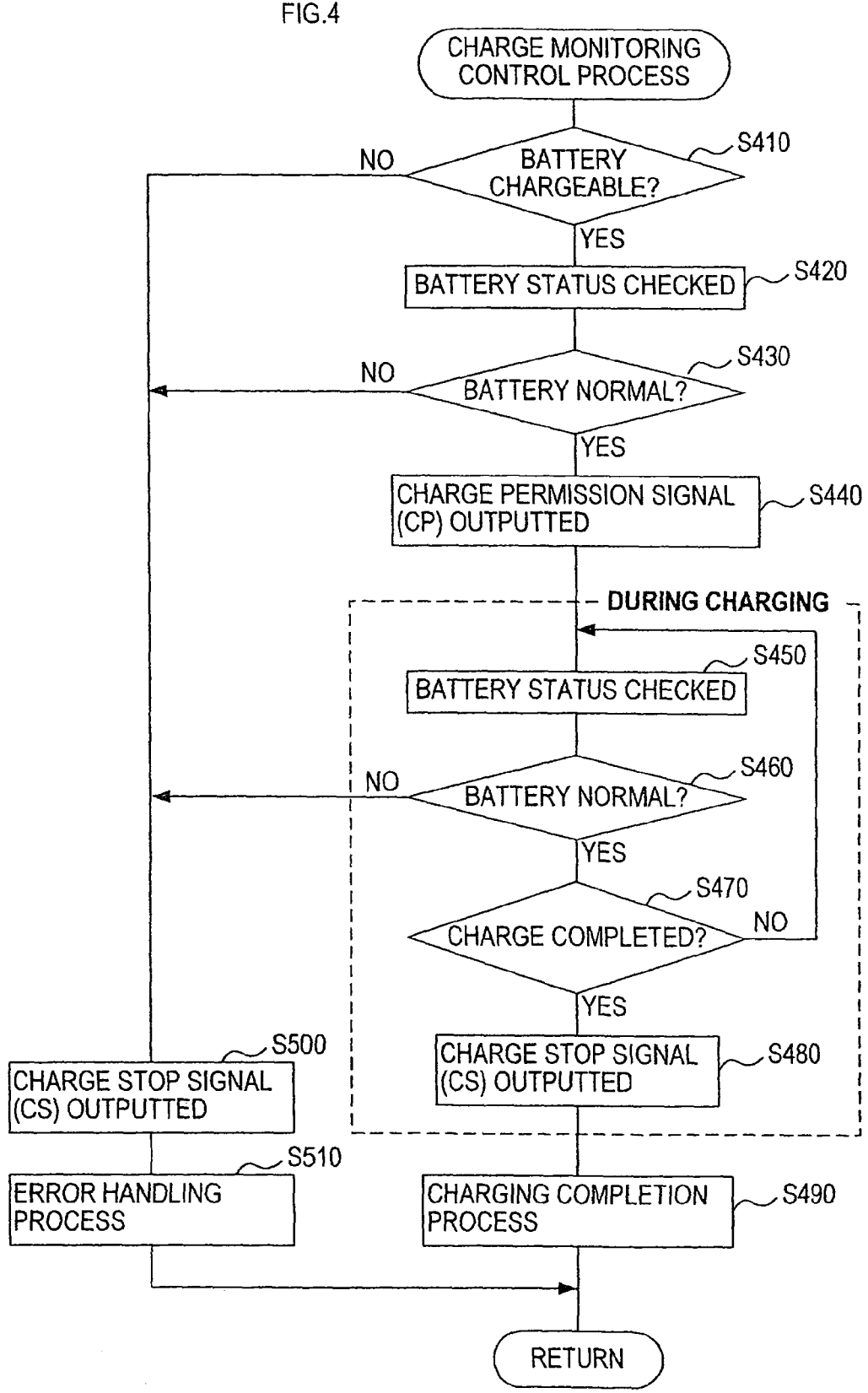
FIG. 4 is a flowchart showing details of control processes for charging monitoring of S120 in the control processes for battery monitoring.

When the battery pack 10 is connected to the battery charger 20, the microcomputer 32 of the battery pack 10 first performs monitoring of the battery 31 to determine whether or not the battery 31 is in a chargeable state and whether or not the battery 31 is normal (S410 and S430 in FIG. 4). If the battery 31 is in a chargeable and normal state, the microcomputer 32 outputs the charge permission signal CP to the battery charger 20, thereby allowing charging of the battery 31.

Thus, occurrence of the following problem can be avoided: even though the battery 31 should not be charged since abnormality or the like has occurred in the battery 31, the battery 31 is charged.

The present embodiment is configured such that the battery voltage Vbat is inputted to the regulator 33 via the diode D1, and the control voltage Vdd is inputted to the regulator 33 via the diode D2. This simple configuration allows the regulator 33 to generate the control voltage Vcc based on a greater one of the battery voltage Vbat and the control voltage Vdd.

In the battery pack 10 of the present embodiment, the diode D3 is connected on the current-carrying path extending from the terminal 51 to the diode D2. Therefore, in a case that the battery voltage Vbat to be inputted to the regulator 33 is directed to be outputted to the battery charger 20 side for some reason, such as a failure in the diode D2 and the like, such output can be inhibited from occurring by the diode D3. In other words, the diode D3 makes it possible to inhibit the battery voltage Vbat from being inadvertently outputted to the battery charger 20 from the terminal 51.

[Modifications]

It should be understood that the above configurations of the present invention are not so limited and may take various forms while still falling within the scope pertinent to the present invention.

For example, other than the configuration providing the diode D3, various configurations can be adopted as long as such configurations can inhibit the control voltage Vcc from being outputted to the battery charger 20 from the terminal 51.

Figure 5:
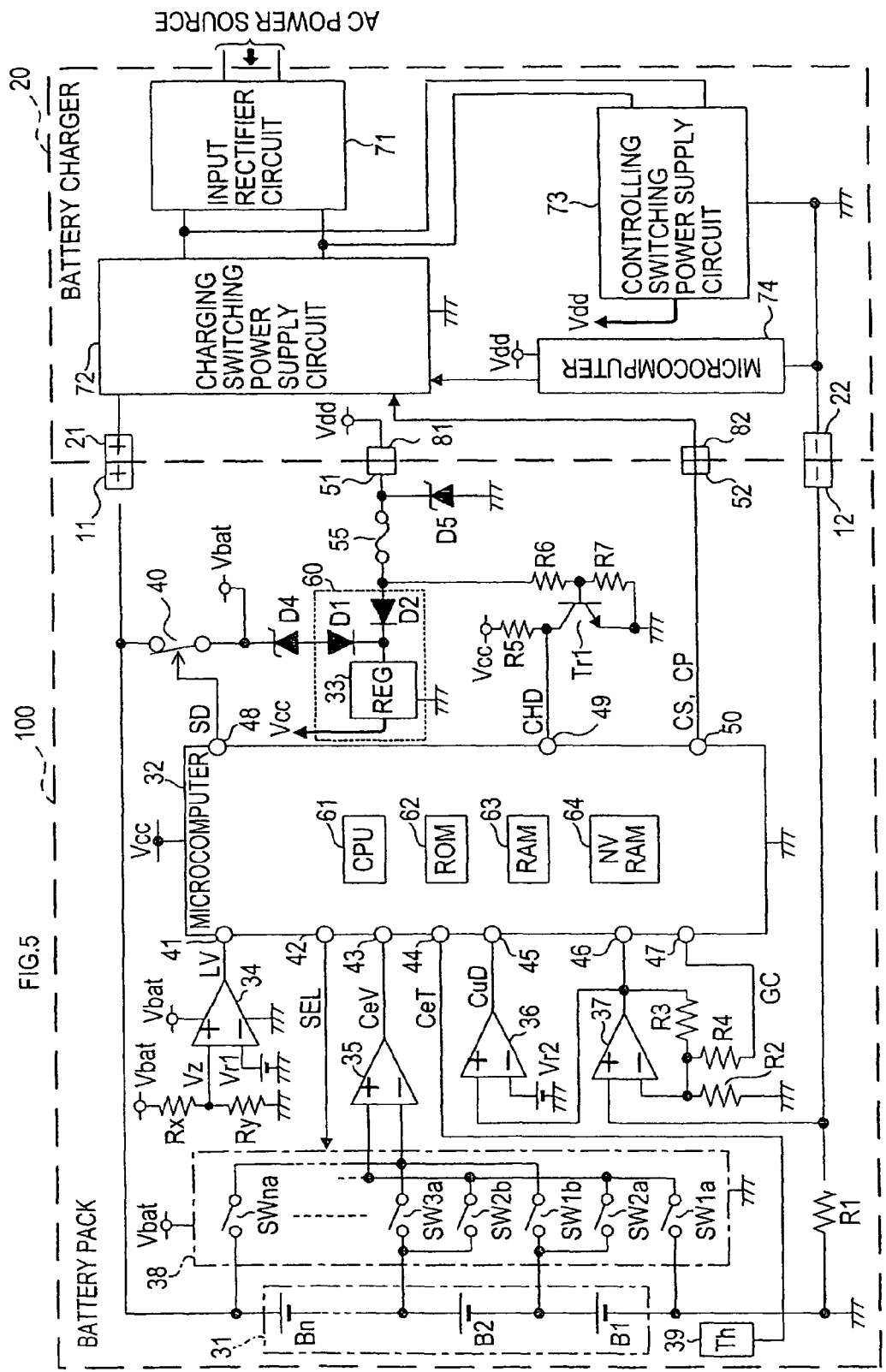
FIG. 5 is an electric circuit diagram showing another embodiment of a charging system for electric power tool.

For instance, as shown in FIG. 5, a fuse 55 may be provided on the current-carrying path extending between the terminal 51 and the diode D2. Also in this case, as shown in FIG. 5, a Zener diode D5 is preferably connected between the terminal 51 and a ground potential. Specifically, the Zener diode D5 is connected such that a cathode thereof is connected to the terminal 51 and an anode thereof is connected to a ground potential side.

A battery pack 100 in FIG. 5 has the same configuration as the battery pack 10 in FIG. 2, except for the following points: the battery pack 100 is provided with the fuse 55, instead of the diode D3 of the battery pack 10; and the battery pack 100 is provided with the Zener diode D5.

The same effect obtained by the configuration including the diode D3 in FIG. 2 can be achieved by the configuration including the fuse 55 and the Zener diode D5.

Details of the configurations of the regulator 33 are not specifically limited. For example, a step-up regulator may be used to generate a battery-side control voltage Vcc higher than an inputted voltage.

In some cases, for example, when the microcomputer 32 is operated with the battery voltage Vbat or when a monitoring circuit operated with the battery voltage Vbat is provided separately from the microcomputer 32, the following configuration may be employed. That is, the battery voltage Vbat may be directly supplied to the microcomputer 32 (monitoring circuit) without passing through the regulator. Also, the control voltage Vdd may be stepped up to the battery voltage Vbat by the regulator, and then the stepped-up voltage may be supplied to the microcomputer 32 (monitoring circuit).

If the control voltage Vdd generated inside the battery charger 20 is equal to the control voltage Vcc, the following configuration may be employed. That is, the control voltage Vdd (=Vcc) inputted to the battery pack 10 from the battery charger 20 may be inputted, without any change, together with the control voltage Vcc to the microcomputer 32.

It should be understood that items to be monitored which are to be outputted to the battery charger 20 from the battery pack 10 are not limited to the above described signals CP and CS. For example, various signals, data, and the like can be outputted to the battery charger 20 as long as they directly or indirectly indicate a status of the battery 31.

In the above embodiment, the explanation is made, by way of example, based on the following values: the battery voltage Vbat is 14.4 V, the control voltage Vcc is 3.3 V, and the control voltage Vdd is 5 V. However, it should be noted that these values are given only by way of example. The same applies to the value of the breakdown voltage (5 V) of the Zener diode D4.

Also, other than the battery 31, a further power source such as a button cell and the like may be provided inside the battery pack 10. Then, if the battery voltage Vbat is decreased, the microcomputer 32 may be operational with the internally provided power source.

The further power source may be provided in various forms as long as the following condition is satisfied: a sufficient electric power can be supplied at least during charging to make the microcomputer 32 operational to monitor the battery 31 even when the battery voltage Vbat is decreased, and the microcomputer 32 becomes unoperational with the decreased battery voltage Vbat.

In the above embodiment, the battery 31 is configured by four battery cells connected in series by way of example only. However, the number of the battery cells composing the battery 31 is not specifically limited, and the battery 31 may include only one battery cell or may be configured by a plurality of battery cells connected in series-parallel. It should be understood that the voltage of each battery cell and the battery voltage are also not limited to the values exemplified in the above embodiment In the above embodiment, the lithium-ion rechargeable battery is exemplified as each of the battery cells composing the battery 31 by way of example only. However, the primary battery or the battery other than the lithium-ion rechargeable battery may also be applied to the present invention as battery cells.

What is claimed is:

1. A battery monitoring system for electric power tool comprising a battery pack for electric power tool, a battery charger for the electric power tool, and an auxiliary power source, wherein the battery pack includes:
a battery that is used as a driving power source for electric power tool and has at least one battery cell; and
a monitoring circuit that is operated by electric power supplied from the battery and monitors a status of the battery,
the battery charger is configured such that the battery charger is detachably attached to the battery pack, and the battery charger generates and outputs charging power for charging the battery, and
the auxiliary power source is provided inside or separately from the battery pack and outputs electric power allowing the monitoring circuit to operate,
wherein the monitoring circuit is configured to be operational by the electric power supplied from the auxiliary power source when the monitoring circuit becomes unoperational with the electric power of the battery due to a decrease in a voltage of the battery, and includes:
a chargeability determination unit that determines whether or not the battery is in a chargeable state by monitoring the battery; and a signal output unit that outputs, as one of the monitored items, a charge permission signal to the battery charger when the battery is determined to be in a chargeable state by the chargeability determination unit, the charge permission signal indicating that the battery is in a chargeable state, wherein the battery charger outputs the charging power to the battery pack when the charge permission signal is inputted to the battery charger from the battery pack.

2. The battery monitoring system according to claim 1, wherein the at least one battery cell included in the battery is a rechargeable battery cell, and wherein the auxiliary power source is provided inside the battery charger and the auxiliary power source is configured to be capable of supplying the electric power of the auxiliary power source to the battery pack when the battery pack is attached to the battery charger.

3. The battery monitoring system according to claim 1, wherein the battery charger includes a charger-side terminal that outputs the electric power of the auxiliary power source to the battery pack, and wherein the battery pack includes a battery pack-side terminal which is connected to the charger-side terminal when the battery pack is attached to the battery charger, and the electric power of the auxiliary power source outputted from the charger-side terminal is inputted to the battery pack through the battery pack-side terminal.

4. The battery monitoring system according to claim 1, wherein the battery pack includes an output terminal that outputs monitored items by the monitoring circuit to the battery charger, and wherein the battery charger includes an input terminal which is connected to the output terminal when the battery pack is attached to the battery charger, and the monitored items outputted from the output terminal is inputted to the battery charger through the input terminal.

5. The battery monitoring system according to claim 4, wherein the signal output unit outputs the charge permission signal to the output terminal, and wherein the battery charger outputs the charging power to the battery pack when the charge permission signal is inputted to the battery charger from the battery pack via the input terminal.

6. The battery monitoring system according to claim 1, wherein the battery pack further includes a connection detecting unit which detects that the battery pack is attached to the battery charger based on an input of the electric power of the auxiliary power source, when the electric power of the auxiliary power source is inputted to the battery pack as a result of the battery pack being attached to the battery charger.

7. The battery monitoring system according to claim 1, wherein the battery pack further includes a power supply circuit to which the voltage of the battery and the voltage of the auxiliary power source are inputted, and the power supply circuit generates an operating power source for operating the monitoring circuit based on one of the voltage of the battery and the voltage of the auxiliary power source, and wherein the monitoring circuit is configured to be operational with the operating power source generated by the power supply circuit.

8. The battery monitoring system according to claim 7, wherein the power supply circuit generates the operating power source based on a greater one of the voltage of the battery and the voltage of the auxiliary power source.

9. The battery monitoring system according to claim 8, wherein the power supply circuit comprises:

a generating circuit to which one of the voltage of the battery and the voltage of the auxiliary power source is inputted, and the generating circuit generating the operating power source based on the voltage inputted;

a first diode having a cathode connected to an input side of the generating circuit, and an anode to which the voltage of the battery is inputted, and a second diode having a cathode connected to the input side of the generating circuit, and an anode to which the voltage of the auxiliary power source is inputted.

10. The battery monitoring system according to claim 7, wherein the battery pack further includes an output stopping unit which is provided on a current-carrying path extending from where the voltage of the auxiliary power source is inputted to the battery pack to where the voltage of the auxiliary power source reaches the power supply circuit, and the output stopping unit inhibits the voltage of the battery to be inputted to the power supply circuit from being outputted to an auxiliary power source side via the current-carrying path.

11. The battery monitoring system according to claim 10, wherein the output stopping unit is a third diode having:

a cathode connected to the power supply circuit; and
an anode to which the voltage of the auxiliary power source is inputted.

12. The battery monitoring system according to claim 10, wherein the output stopping unit is a fuse.

13. A battery pack for electric power tool comprising:
a battery having at least one battery cell; and
a monitoring circuit that is operated by electric power supplied from the battery, and monitors a status of the battery;

wherein the monitoring circuit is configured to be operational by electric power supplied from an auxiliary power source different from the battery when the monitoring circuit is unoperational with electric power of the battery due to a decrease in a voltage of the battery, and includes:

a chargeability determination unit that determines whether or not the battery is in a chargeable state by monitoring the battery; and a signal output unit that outputs, as one of the monitored items, a charge permission signal to a battery charger for the electric power tool when the battery is determined to be in a chargeable state by the chargeability determination unit, the charge permission signal indicating that the battery is in a chargeable state, and wherein the battery pack is configured to be supplied with charging power from the battery charger when the charge permission signal is inputted into the battery charger.

14. A battery charger for electric power tool configured such that the battery charger is detachably attached to a battery pack for electric power tool, the battery pack including:

a battery having at least one battery cell; and
a monitoring circuit being operated by electric power supplied from the battery and monitoring a status of the battery, the monitoring circuit including:

a chargeability determination unit that determines whether or not the battery is in a chargeable state by monitoring the battery; and a signal output unit that outputs, as one of the monitored items, a charge permission signal to the battery charger when the battery is determined to be in a chargeable state by the chargeability determination unit, the charge permission signal indicating that the battery is in a chargeable state, wherein the battery charger generates and outputs charging power for charging the battery, wherein the battery charger further includes an auxiliary power source that outputs electric power allowing the monitoring circuit to operate, and wherein the battery charger is configured to be capable of supplying the electric power of the auxiliary power tool to the battery pack when the battery pack is attached to the battery charger, and is configured to output the charging power to the battery pack when the charge permission signal is inputted from the battery pack.

* * * * *